United States Patent [19]

Hinz et al.

[11] Patent Number: 4,835,628

[45] Date of Patent: May 30, 1989

[54] APPARATUS AND METHOD FOR FORMATTING AND RECORDING DIGITAL DATA ON MAGNETIC TAPE

[75] Inventors: Harry C. Hinz, Arvada; Christopher P. Zook, Lafayette, both of Colo.

[73] Assignee: Exabyte Corporation, Boulder, Colo.

[21] Appl. No.: 48,406

[22] Filed: May 11, 1987

[51] Int. Cl.$^4$ .................................................. G11B 5/09
[52] U.S. Cl. .......................................... 360/48; 360/39
[58] Field of Search ...................... 360/39, 40, 48, 49, 360/47, 51, 27, 28

[56] References Cited

U.S. PATENT DOCUMENTS

| | | | |
|---|---|---|---|
| 4,081,844 | 3/1978 | Devore et al. | 360/48 |
| 4,554,598 | 11/1985 | Iarbox et al. | 360/48 |
| 4,609,949 | 9/1986 | Kuraragi | 360/28 |
| 4,651,239 | 3/1987 | Omori et al. | 360/27 |
| 4,731,678 | 3/1988 | Takeuchi | 360/40 |

Primary Examiner—Vincent P. Canney
Attorney, Agent, or Firm—Griffin, Branigan & Butler

[57] ABSTRACT

Apparatus and method are disclosed for formatting and recording digital information. Recording is effected by discrete stripes on 8 mm magnetic tape using a helical scan arrangement that enables a high recording density and a low error rate. Formatting in the data area of each stripe includes recording of digital information within preamble, data block, and postamble sections. The preamble section provides frequency/phase and location referencing, the data block section includes a plurality of physical data blocks each of which are divided into sub-blocks that include synchronizing and identifying information along with data to be recorded, and the postamble section ensures compatibility of physical alignment between the recording heads and magnetic tape.

64 Claims, 5 Drawing Sheets

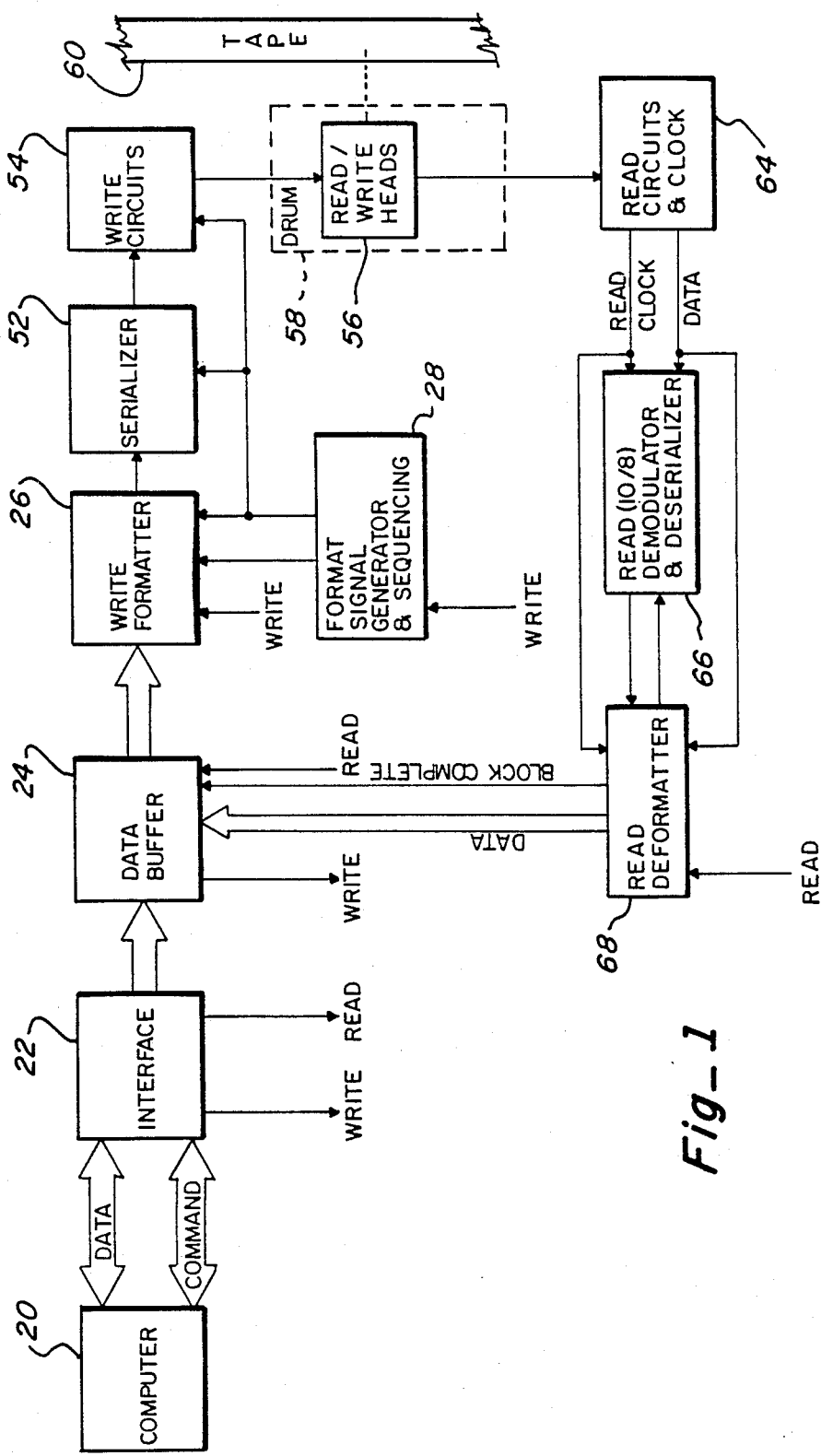
Fig_1

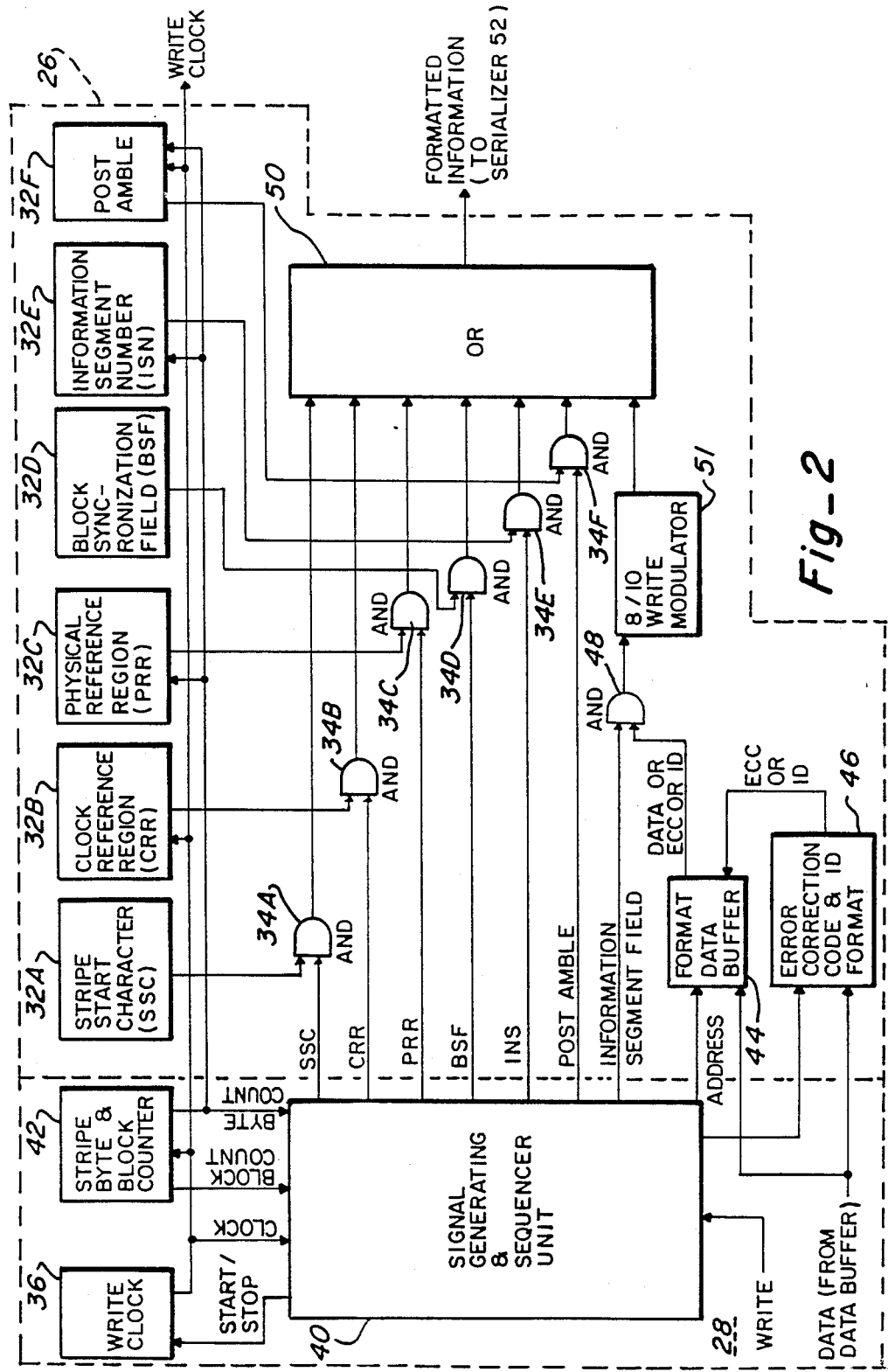
Fig_2

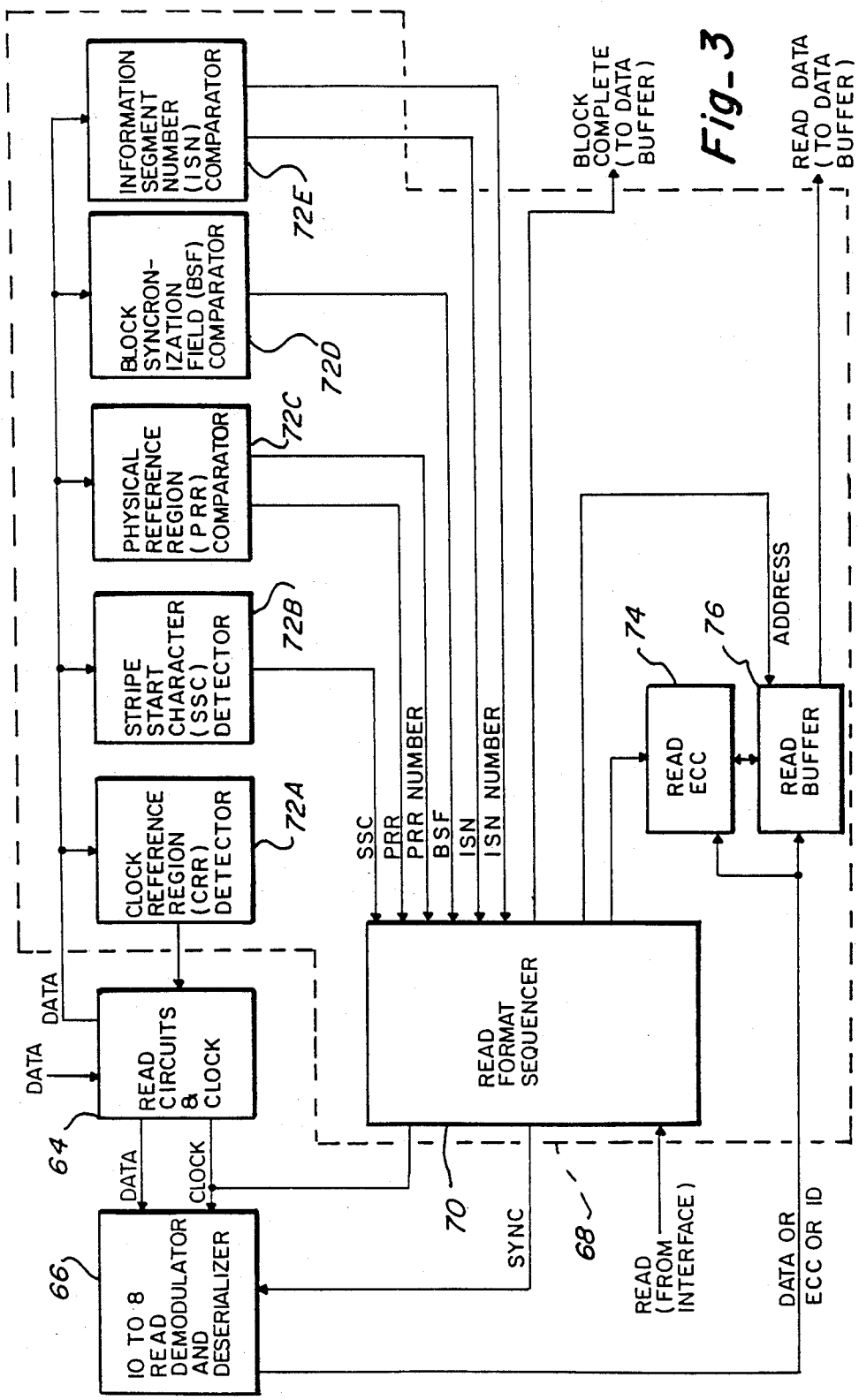

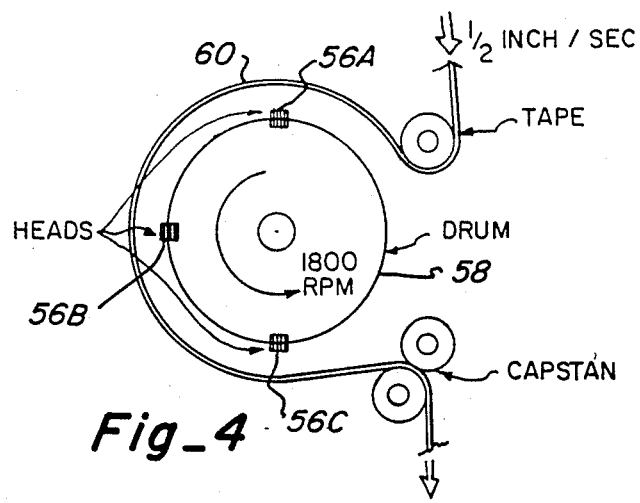
Fig_4
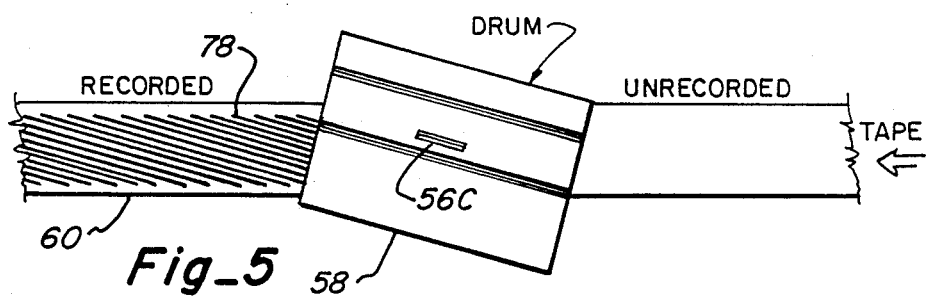
Fig_5
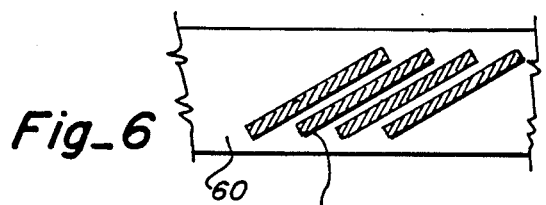
Fig_6
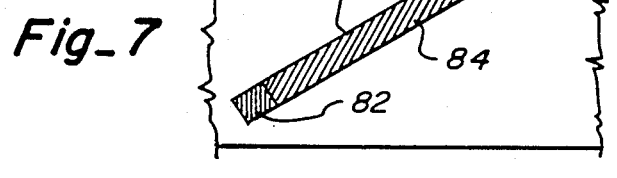
Fig_7
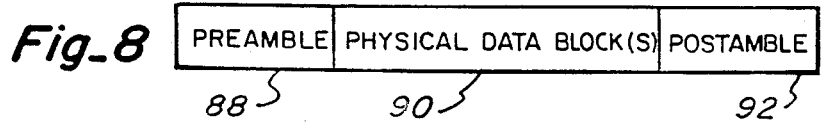
Fig_8

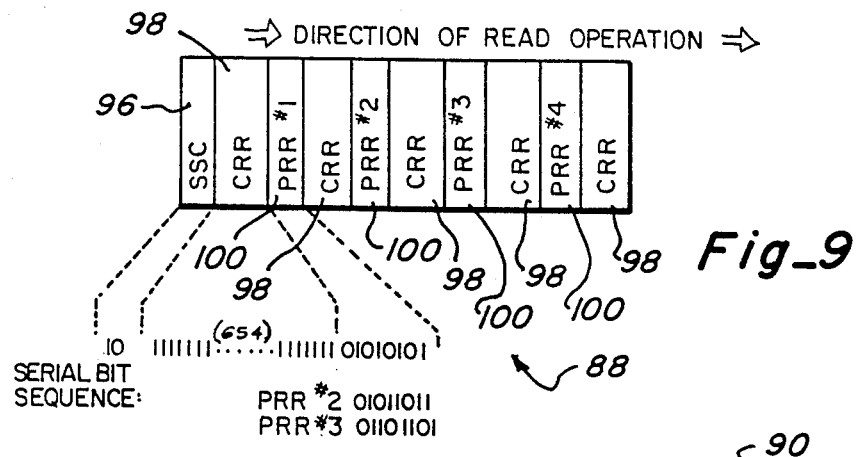
Fig_9
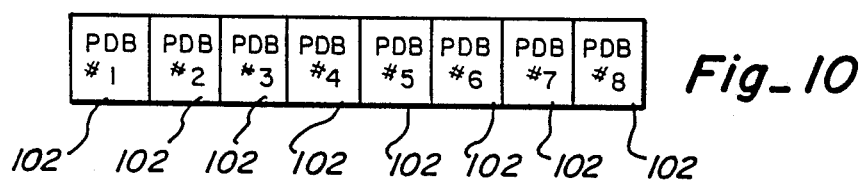
Fig_10
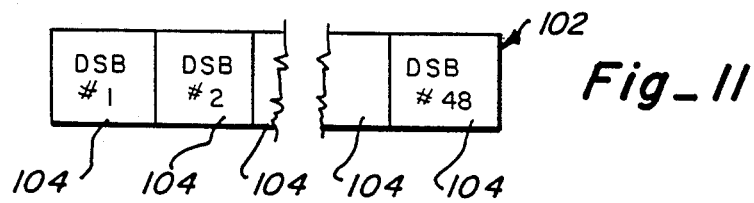
Fig_11
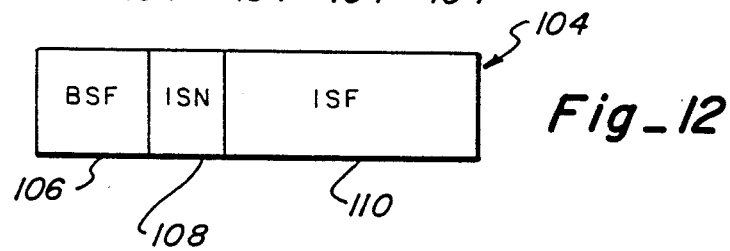
Fig_12
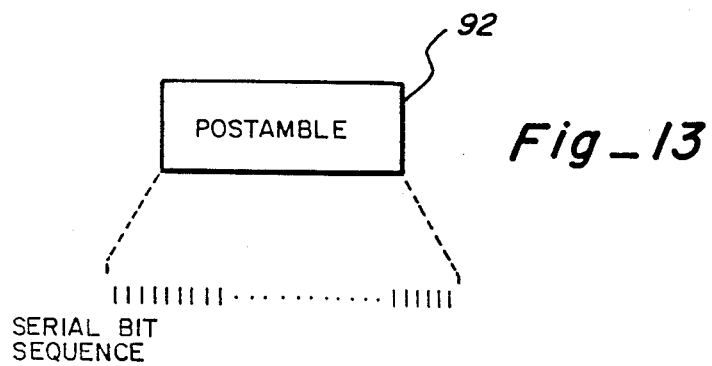
Fig_13

APPARATUS AND METHOD FOR FORMATTING AND RECORDING DIGITAL DATA ON MAGNETIC TAPE

FIELD OF THE INVENTION

The invention relates to magnetic tape recording, and, more particularly, relates to formatting and recording digital data on magnetic tape.

BACKGROUND OF THE INVENTION

Recording of information on magnetic tape is now well known, and has heretofore been utilized in a number of diverse areas with recording of video and/or audio information being one of the better known uses of such recording. It has also been suggested that magnetic tape recording can also be utilized to provide backup, or temporary storage, for computer-generated data (see, for example, U.S. Pat. No. 4,380,047).

When recording video and/or audio information, a fairly high error rate can be tolerated (typically on the order of one error in $10^3$ to $10^6$ bits). Such high error rates cannot be tolerated, however, with at least some other uses, and cannot be tolerated, for example, where the device is to serve as a backup unit for a computer to store computer-generated data where the error rate must typically be no greater than on the order of one error in $10^{13}$ bits.

Recording on 8 mm magnetic tape has also been heretofore suggested and/or utilized, and it is likewise known that information can be recorded on magnetic tape using a helical scan arrangement wherein information is recorded on the tape in stripes that extend across the tape at an angle with respect to the edge of the tape and the running direction of the tape (see, for example, U.S. Pat. No. 4,613,912).

It has also been heretofore suggested that a digital recording system could be effectively utilized for storing information, and it has been suggested that such a recording system could be utilized in connection with computer-generated data (see, for example, U.S. Pat. No. 4,363,050).

It has also been suggested that a video cassette recorder can be utilized to store computer-generated data, and that such data can be handled by data blocks (see, for example, U.S. Pat. No. 4,530,048).

Thus, while varius tape recording techniques have been heretofore suggested and/or utilized, improved devices and/or methods can nevertheless still be advantageously utilized to provide, for example, high recording density and/or low error rates.

SUMMARY OF THE INVENTION

This invention provides improved formatting and recording of digital data on magnetic tape, and enables high density recording and/or low error rates. The invention is particularly well suited for use as a backup unit for storing computer-generated data.

Formatting and recording preferably includes three sections (preamble, data block, and postamble) with the preamble section including frequency/phase and location referencing, with the data block section including synchronizing and identifying referencing along with data to be recorded, and the postamble section providing compatibility of physical alignment between the recording heads and magnetic tape. Recording is preferably effected using a helical scan arrangement to record discrete stripes on the tape, which tape is preferably 8 mm tape.

It is therefore an object of this invention to provide improved formatting and recording on magnetic tape.

It is another object of this invention to provide improved formatting and recording on magnetic tape by stripes enabling high density recording and/or low error rates.

It is still another object of this invention to provide improved formatting and recording on magnetic tape of computer-generated data.

It is still another object of this invention to provide improved formatting and recording on magnetic tape by separate defined sections.

It is still another object of this invention to provide improved formatting of data to be recorded on magnetic tape.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a block diagram illustrating the invention;

FIG. 2 is a block diagram illustrating the overall operation of the WRITE formatter and format signal generator shown in FIG. 1;

FIG. 3 is a block diagram illustrating the overall operation of the READ circuits and clock, demodulator/deserializer and deformatter shown in FIG. 1;

FIG. 4 is a schematic illustration of magnetic head placement on a rotatable drum for helical scan recording on magnetic tape;

FIG. 5 is a schematic illustration of recording on magnetic tape by stripes using a helical scan recording arrangement;

FIG. 6 is an illustration of a typical arrangement of stripes on magnetic tape using a helical scan arrangement;

FIG. 7 is an illustration of a single stripe showing typical positioning of servo and data areas on the stripe;

FIG. 8 is an illustration of a single stripe having three segments thereon in the data area;

FIG. 9 illustrates the preamble section of the stripe as shown in FIG. 8;

FIG. 10 is an illustration of the data block section of a stripe as shown in FIG. 8;

FIG. 11 is an illustration of one of the physical data blocks shown in FIG. 10;

FIG. 12 is an illustration of one of the data sub-blocks shown in FIG. 11; and

FIG. 13 is an illustration of the postamble section shown in FIG. 8.

DESCRIPTION OF THE INVENTION

In this invention, data in digital form is recorded on magnetic tape, preferably utilizing a helical scan arrangement, so that the data can be physically recorded on the tape in a series of discrete stripes positioned at an angle with respect to the direction of tape travel. When the data on the discrete stripes are concatenated, they form a continuous stream of decipherable information.

In order for the recorded digital data to be later recovered from the tape in a decipherable form, it is necessary that the data be formatted prior to recording to provide sufficient referencing information on the tape, in addition to the recorded data, to enable later recovery during readout.

The block diagram of FIG. 1 illustrates the overall arrangement utilized in this invention. As shown, computer-generated data to be recorded is received from computer 20 through interface 22 and coupled to data buffer 24 where the data is placed into data blocks for processing.

The data from data buffer 24 is coupled to WRITE formatter 26 where the data is formatted, by having combined therewith digital information in response to signals generated by format signal generating and sequencing unit 28.

As indicated, command signals from computer 20 are coupled to interface 22, and interface 22 provides WRITE and READ signals for determining information and data flow through the system as indicated in FIG. 1.

FIG. 2 indicates the overall relationship of WRITE formatter 26 and format signal generator and sequencer 28. WRITE formatter 26 includes a series of reference signal generators 32A through 32F which provide the digital information to be combined and formatted with the data and which are connected to provide an input to AND gates 34A through 34F. Signal generator and sequencer 28 includes write clock 36 connected with main signal generating and sequencer unit 40 and to clock reference region generator 32B, postamble generator 32F and stripe byte and block counter 42. Counter 42 is connected with generating and sequencing unit 40 for block count, and to unit 40 and generators 32C, 32E and 32F for byte count.

Data is initially received from data buffer 24 at format data buffer 44 and error correction code (ECC) and identification (ID) formatter 46 of WRITE formatter 26 for addition of error detection data and identification data to received user data blocks. The combined data from ECC and ID formatter 46 is coupled to format data buffer 44 responsive to signals from signal generating and sequencing unit 40. Format data buffer 44 is connected with AND gate 48 to provide an input thereto. AND gates 34A through 34F are connected to OR gate array 50, as is the output from 8/10 WRITE modulator 51. 8/10 WRITE modulator 51 receives the output from AND gate 48.

When a WRITE signal is received from interface 22 by signal generating and sequencer unit 40, signals are provided as a second input to AND gates 34A through 34F and 48 from unit 40 in a predetermined sequence thereby sequentially opening the gates to the data and reference signals presented at the gates by generators 32A through 32F and format data buffer 44. Data from gate 48 is 8 to 10 bit translated at 8/10 WRITE modulator 51. The 10-bit data and 10-bit reference signals are sequentially received at OR gate array 50 where all the combined data and reference signals are provided as an output in a parallel formatted stream to serializer 52, a parallel-to-serial bit stream converter.

Referring again to FIG. 1, the formatted information is coupled from WRITE formatter 26 through serializer 52 and WRITE circuits 54 to magnetic READ/WRITE (pickup) heads 56 (positioned on drum 58) for recording of the formatted information on tape 60 during the WRITE mode.

As also indicated in FIG. 1, tape 60 is read by READ/WRITE heads 56 during the READ mode, and the information read is coupled through READ circuits and clock 64 and READ demodulator and deserializer 66 to READ deformatter 68 where the referencing signals in the recorded formatted information are removed and the thus recovered data is then coupled to data buffer 24.

FIG. 3 shows the overall relationship of READ circuits and clock 64, READ demodulator and deserializer 66 and READ deformatter 68. Data to be read is received at READ circuits 64 from READ/WRITE heads 56 and, together with a clock signal, is coupled to READ demodulator 66 and READ deformatter 68. The clock signal is received by READ format sequencer 70 of deformatter 68, and the data is received at reference signal detectors and comparators 72A through 72E and at READ ECC (error correction code) 74 and READ buffer 76 of deformatter 68 (for user block identification and analysis and data error sensing and correction). As the various reference signals are sensed and removed by detectors and comparators 72B through 72E and coupled to READ format sequencer 70 (the clock reference region signal being coupled with READ circuits and clock 64), synchronization signals are processed to READ demodulator 66 and data is addressed upon input and output from READ buffer 76 resulting in properly sequenced data output, after correction and identification, to data buffer 24. A separate signal from READ format sequencer 70 to data buffer 24 may be provided to indicate to buffer 24 when READ buffer 76 has received a full, checked and identified data block.

After being deformatted, the data is then taken from data buffer 24 and coupled through interface 22 to computer 20 for display or other utilization purposes as indicated in FIG. 1.

As best shown in FIGS. 4 and 5, a helical scan arrangement is preferably used in this invention. As indicated, tape 60 is partially wrapped around drum 58 so that heads 56A, 56B and 56C, positioned on drum 58, as indicated in FIG. 4, are contiguous to the tape for brief periods since the drum is rotated at a high speed relative to tape speed. As shown, pickup head 56A is a READ/WRITE head, head 56B is a servo head, and head 56C is a READ head used for after-WRITE purposes.

With the tape running at ½ inch per second and the drum rotating at 1800 rpm, as indicated in FIG. 4, and with the axis of the drum being oriented at an angle with respect to the direction of tape movement, as best indicated in FIG. 5, this results, during the WRITE mode, in a series of discrete stripes 78 of information being recorded on the tape at an angle with respect to the tape edges and direction of tape travel. Such an arrangement is known in the art, and is commonly referred to as a helical scan recording arrangement.

The stripes are parallel and adjacent to one another, as best indicated in FIG. 6, and may be continued in the same pattern for the length of the recorded portion of the tape (except when interrupted for other uses), with the angle of the stripes with respect to the tape dependent upon the relative speed of tape and drum, well as the orientation of the drum with respect to the tape. The use of the helical scan arrangement has been found useful in this invention for use in recording on magnetic tape to achieve high density recording and/or low error rates.

When in the READ mode, the information recorded on magnetic tape 60 can be read from the tape, preferably using READ/WRITE head 56A, with the drum rotating at the same speed as during the WRITE mode and with the tape traveling at the same speed as during the WRITE mode.

For tracking and control purposes, it is preferable that a portion of each stripe include tracking and control information in addition to the computer-generated data to be recorded. This can include, for example, a separate servo tracking area 82 in addition to the data recording area 84, as shown in FIG. 7.

Servo tracking area 82 provides tracking and control information for maintaining the READ/WRITE heads aligned with the stripes on the magnetic tape. In general, the use of servo tracking areas are well known in the art. Although it is possible that the servo tracking area could be located anywhere on the stripe, and that the servo area might overlap the data area in some instances, the servo area is preferably physically separated in this invention from the data area.

As indicated in FIG. 8, each data area 84 includes distinct sections, or zones, with specific functions. In the order that these zones are read by a READ/WRITE head 56, the zones are preamble zone 88, data block zone 90 and postamble zone 92. The characteristics and location of these zones are important in achieving the desirable ends of this invention.

Preamble section, or zone, 88 is shown in greater detail in FIG. 9. The preamble serves several purposes, including: providing frequency and phase reference (for the reading unit phase-lock-loop electronics); providing physical intra-track location references; and providing a sufficient length of non-data run-in to ensure compatibility of physical alignment between the magnetic tape and the pickup (READ/WRITE) heads during subsequent READ-WRITE modes of operation.

Because preamble section 88 is physically located near one edge of tape 60, the frequency of drop outs (i.e., unusable areas) and mistracking due to variances in physical alignment is higher than at the middle of the tape. For this reason, preamble section 88 is designed as a redundant system for achieving the purposes as set forth above.

Preamble section 88 begins with a stripe start character (SSC) 96, which is two bits in length and includes a binary ONE (1) followed by binary ZERO (0) in the preferred embodiment of this invention. The remainder of preamble zone 88 consists of interleaved clock reference regions (CRRs) 98 and physical reference regions (PRRs) 100.

As shown in FIG. 9, a clock reference region 98 immediately follows the stripe start character and alternates with physical reference regions 100 thereafter. Each clock reference region includes a plurality of bits having the same make-up, which, in the preferred embodiment of this invention, consists of 654 binary ONEs, and provides a frequency and phase reference to the drive unit reading electronics. A sufficient number of clock reference regions are used to ensure that frequency and phase information is available. Reading a single or multiple of the clock reference regions is sufficient to establish the frequency and phase reference.

Each physical reference region 100 contains a uniquely identifiable bit sequence of minimal length. The physical reference regions are 8 bits in length and provide intra-stripe physical location references, with the physical reference regions of the preferred embodiment being numbered 1 through 4 and have the following bit coding: 1-01010101; 2-01011011; 3-01101101; and 4-01110110.

By reading the physical reference regions, the location of the pickup system with respect to the stripe can be precisely determined. An important feature of the physical reference regions is that they provide absolute location references with respect to the tape. This method of recording physical references is preferable over other methods, such as, for example, deriving approximate physical location references from external events (an example of an external event is the instantaneous position of the pickup head). A sufficient number of physical reference regions are used to ensure that an accurate location reference is available. Reading any single or multiple of physical reference regions is sufficient to establish a location reference.

As indicated in FIG. 9, the pattern of alternating clock reference regions and physical reference regions continues to the end of the preamble section, and includes a total length of 3304 bits of binary serial information.

As indicated in FIG. 10, data block section 90 of each stripe contains a plurality of physical data blocks 102. In the preferred embodiment of this invention, eight physical data blocks 102 are utilized, as is also indicated in FIG. 10. Within each physical data block 102 is a plurality of data sub-blocks 104, as indicated in FIG. 11. In the preferred embodiment of this invention, 48 data sub-blocks 104 are included in each physical data block. It is to be realized, however, that the number of physical data blocks 102 and data sub-blocks 104 could be varied as needed or desired.

Each data sub-block 104 is divided into sections, as indicated in FIG. 12, and, as indicated, each data sub-block 104 includes a bit synchronization field (BSF) 106, information segment number (ISN) 108, and information segment field (ISF) 110. The purpose of this arrangement is to provide a self-contained block of decipherable information. To achieve this end, each data sub-block 104 contains independent synchronization and sequencing information. Bit synchronization field 106 is a non-RLL code, followed by 8/10 RLL coded information segment number 108, which is followed by information segment field 110.

Bit synchronization field 106 is a unique finite-length sequence which can be identified using the 8/10 RLL bit stream. In the preferred embodiment of this invention, a 20 bit sequence is utilized with the sequence being 01111111111111111110. This sequence has the desired property of being extremely unlikely to occur as a result of random errors due to improper coding or tape defects in normal 8/10 RLL data due to the selection of 8/10 translation as set forth hereinbelow. The sequence also can provide frequency and phase reference for the READ electronics. Because the bit synchronization field is located periodically throughout physical data blocks 102, it allows for periodic calibration of frequency and phase as the stripe is read.

Bit synchronization field 106 provides a reference within the serial bit stream of each data sub-block 104 for initiating decoding of the 8/10 RLL information segment number 108 and information segment field 110 that follows the information segment number. The 8/10 RLL starting boundary is established whenever the bit synchronization field is encountered, whereafter the 10-bit RLL code is decoded into 8-bit words until another bit synchronization field is encountered.

Bit synchronization fields 106 are designed as a redundant system, whereby the bit synchronization fields 106 of other data sub-blocks can be used to establish or verify the bit synchronization field of the current data sub-block. As a result, the format is highly tolerant to missing or suspect bit synchronization fields.

Information segment number 108, which follows each bit synchronization field 106, is a 10-bit RLL sequence that provides a segment identifier for information segment field 110 that follows. In the preferred embodiment of this invention, information segment field 110 has 30 units of 10-bits of information each, and there are 48 unique information segment numbers 108, which correspond to the 48 data sub-blocks 104 in each physical data block 102.

In the preferred embodiment of the invention, 8 to 10-bit translation of data for recording on information segment fields 110, and of information segment numbers 108, may be accomplished, for example, in the following manner, it being understood that other modes of translation may be used as would be apparent to one skilled in the art. There are 355 10-bit values which obey the RLL rules (i.e., cannot begin or end with two zeros and cannot have three zeros in a row). These may be broken down into the following classes:

Class I: DSV=0, Parity −: 66 Values
Class II: DSV=0, Parity +: 75 Values
Class III: DSV=2, Parity −: 22 Values
Class IV: DSV=−2, Parity −: 66 Values
Class V: DSV=2, Parity +: 46 Values
Class VI: DSV=−2, Parity +: 42 Values
Class VII: DSV=+4, −6, Parity +/−: 38 Values Of these values, 256 are chosen to correspond to the 256 possible 8-bit values. From Class I, 65 are chosen. The one not chosen is 0111111111 in order to avoid confusion with the bit synchronization field character. From Class II, 74 are chosen. The one not chosen is 1111111111 in order to prohibit the bit synchronization field character from occurring in a data field. From Class III, all 22 are selected. From Class IV, 65 are chosen. The one not selected (1111111110) is again for the purpose of assuring that the bit synchronization field sequence is distinguishable. From Class V, 18 are chosen and, from Class VI, 12 are chosen. None are chosen from Class VII.

In the preferred embodiment of this invention, low digital sum variation (DSV) values of the 10-bit word (measured in absolute value whether + or −) are preferred over high DSV values, and odd parity is preferred over even parity in order to minimize the low frequency content of the recorded signal (for example, if the integral over the recorded signal equals 0, the D.C. content of the signal is 0). Once the set of 10-bit values is picked, it is put into a 1-to-1 correspondence with the set of 8-bit values, for example as shown in Table I hereinafter following wherein 8-bit values are expressed in hexadecimal numbers. The particular correspondence selected provides a translation which can be performed with combinatorial logic (about 1000 gates) which easily fits into a gate array (LSI chip) and makes tabular methods (ROMs and the like) unnecessary.

From the set of 256 10-bit values, 48 are chosen for use also as the 48 information segment numbers. Of the 256 values, there are 53 10-bit values which begin and end with 1 and which do not have two zeros in a row.

These properties are desirable because such 10-bit values will have the lowest bit-shift tendencies. From these 53, 48 are chosen and put in 1-to-1 correspondence with 0 to 47 (normally represented by 6-bit values), corresponding to the 48 sub-blocks 104, in order to minimize the translation logic (as shown in Table 2 following hereinafter and wherein 6-bit values are expressed in hexadecimal numbers.)

Like bit synchronization fields 106, information segment numbers 108 of other data sub-blocks can be used to establish or verify the information segment number of the current data sub-block. It is thus possible to implement a system of cross-verification and correction of data and information serial numbers, resulting in a format that is highly tolerant to decoding errors and media defects. Conversely, the system assures a very high level of data integrity and low error rate.

Information segment field 110 contains the data to be recorded, and may also contain other data such as error detection and/or correction information or other control information, for example, an identification number for the logical data blocks (i.e., the user data blocks). In the preferred embodiment, each information segment field consists of 30 10-bit serial words of RLL code, and physically follows information segment number 108.

The last section of each stripe is postamble section 92. FIG. 13 shows postamble section 92, which in the preferred embodiment of this invention consists of a 3304-bit serial sequence of all binary ONEs (alternating ONEs and ZEROs could be utilized, if desired). Postamble section 92 may be used for frequency or phrase referencing, and is of a sufficient length to ensure compatibility of physical alignment between the magnetic tape and the pickup heads during subsequent READ/WRITE operations.

In a working embodiment of this invention, computer-generated information was formatted and recorded with a recording density of 36 million bits per square inch on 8 mm tape, with the tape moving at a rate of ½ inch per second and the drum, having 3 magnetic heads mounted thereon, rotated at 1800 rpm. The recorded information was then later recovered and found to have an error rate less than 1 in $10^{13}$ bits read.

From the foregoing, it can be appreciated this invention provides improved formatting and recording on magnetic tape that is particularly well suited for use in high density recording applications, such as for computer backup purposes.

TABLE I

Data Translations
(Even Number of Bits, Polarity is +;
Odd Number of Bits, Polarity is −)

| 8 (Hex.) | 10 |
|---|---|
| 00 | 0100100101 |
| 01 | 0100100111 |
| 02 | 0100101010 |
| 03 | 0100101101 |
| 04 | 0100101111 |
| 05 | 0100111001 |
| 06 | 0100111011 |
| 07 | 0100111110 |
| 08 | 0101001001 |
| 09 | 0101001011 |
| 0A | 0101001110 |
| 0B | 0101010010 |
| 0C | 0101010101 |
| 0D | 0101010111 |
| 0E | 0101011010 |
| 0F | 0101011101 |

TABLE I-continued

Data Translations
(Even Number of Bits, Polarity is +;
Odd Number of Bits, Polarity is −)

| 8 (Hex.) | 10 |
|---|---|
| 10 | 0101101001 |
| 11 | 0101101011 |
| 12 | 0101101110 |
| 13 | 0101110010 |
| 14 | 0101110101 |
| 15 | 0101110111 |
| 16 | 0101111010 |
| 17 | 0101111101 |
| 18 | 0110100101 |
| 19 | 0110100111 |
| 1A | 0110101010 |
| 1B | 0110101101 |
| 1C | 0110101111 |
| 1D | 0110111001 |
| 1E | 0110111011 |
| 1F | 0110111110 |
| 20 | 0111001001 |
| 21 | 0111001011 |
| 22 | 0111001110 |
| 23 | 0111010010 |
| 24 | 0111010101 |
| 25 | 0111010111 |
| 26 | 0111011010 |
| 27 | 0111011101 |
| 28 | 0111101001 |
| 29 | 0111101011 |
| 2A | 0111101110 |
| 2B | 0111110010 |
| 2C | 0111110101 |
| 2D | 0111110111 |
| 2E | 0111111010 |
| 2F | 0111111101 |
| 30 | 1001110011 |
| 31 | 1001110110 |
| 32 | 1001001010 |
| 33 | 1001001101 |
| 34 | 1001001111 |
| 35 | 1001011001 |
| 36 | 1001011011 |
| 37 | 1001011110 |
| 38 | 0110010011 |
| 39 | 0110010110 |
| 3A | 1010011111 |
| 3B | 1010010010 |
| 3C | 1010010101 |
| 3D | 1010010111 |
| 3E | 1010011010 |
| 3F | 1010011101 |
| 40 | 1010101001 |
| 41 | 1010101011 |
| 42 | 1010101110 |
| 43 | 1010110010 |
| 44 | 1010110101 |
| 45 | 1010110111 |
| 46 | 1010111010 |
| 47 | 1010111101 |
| 48 | 1011100101 |
| 49 | 1011100111 |
| 4A | 1011101010 |
| 4B | 1011101101 |
| 4C | 1011101111 |
| 4D | 1011111001 |
| 4E | 1011111011 |
| 4F | 1011111110 |
| 50 | 1100100101 |
| 51 | 1100100111 |
| 52 | 1100101010 |
| 53 | 1100101101 |
| 54 | 1100101111 |
| 55 | 1100111001 |
| 56 | 1100111011 |
| 57 | 1100111110 |
| 58 | 1101001001 |
| 59 | 1101001011 |
| 5A | 1101001110 |
| 5B | 1101010010 |
| 5C | 1101010101 |
| 5D | 1101010111 |
| 5E | 1101011010 |
| 5F | 1101011101 |
| 60 | 1101101001 |
| 61 | 1101101011 |
| 62 | 1101101110 |
| 63 | 1101110010 |
| 64 | 1101110101 |
| 65 | 1101110111 |
| 66 | 1101111010 |
| 67 | 1101111101 |
| 68 | 1110100101 |
| 69 | 1110100111 |
| 6A | 1110101010 |
| 6B | 1110101101 |
| 6C | 1110101111 |
| 6D | 1110111001 |
| 6E | 1110111011 |
| 6F | 1110111110 |
| 70 | 1111001001 |
| 71 | 1111001011 |
| 72 | 1111001110 |
| 73 | 1111010010 |
| 74 | 1111010101 |
| 75 | 1111010111 |
| 76 | 1111011010 |
| 77 | 1111011101 |
| 78 | 1111101001 |
| 79 | 1111101011 |
| 7A | 1111101110 |
| 7B | 1111110010 |
| 7C | 1111110101 |
| 7D | 1111110111 |
| 7E | 1111111010 |
| 7F | 1111111101 |
| 80 | 0100101011 |
| 81 | 0100101110 |
| 82 | 0100110101 |
| 83 | 0100111010 |
| 84 | 0101101010 |
| 85 | 0101101111 |
| 86 | 0101111011 |
| 87 | 0101111110 |
| 88 | 0111001010 |
| 89 | 0111001111 |
| 8A | 0111011011 |
| 8B | 0111011110 |
| 8C | 1001001011 |
| 8D | 1001001110 |
| 8E | 1001010101 |
| 8F | 1001011010 |
| 90 | 1001101001 |
| 91 | 1001110010 |
| 92 | 1001110111 |
| 93 | 1001111101 |
| 94 | 1010101010 |
| 95 | 1010101111 |
| 96 | 1010111011 |
| 97 | 1010111110 |
| 98 | 1011001001 |
| 99 | 1011010010 |
| 9A | 1011010111 |
| 9B | 1011011101 |
| 9C | 1011101011 |
| 9D | 1011101110 |
| 9E | 1011110101 |
| 9F | 1011111010 |
| A0 | 1101001010 |
| A1 | 1101001111 |
| A2 | 1101011011 |
| A3 | 1101011110 |
| A4 | 1010100101 |
| A5 | 1110010010 |
| A6 | 1110010111 |
| A7 | 1110011101 |

TABLE I-continued

Data Translations
(Even Number of Bits, Polarity is +;
Odd Number of Bits, Polarity is −)

| 8 (Hex.) | 10 |
|---|---|
| A8 | 1110101011 |
| A9 | 1110101110 |
| AA | 1110110101 |
| AB | 1110111010 |
| AC | 1111100101 |
| AD | 1111101010 |
| AE | 1111101111 |
| AF | 1111111011 |
| B0 | 0100111111 |
| B1 | 1001011111 |
| B2 | 1011111111 |
| B3 | 1110111111 |
| B4 | 0101100101 |
| B5 | 0110100110 |
| B6 | 1111010011 |
| B7 | 1111010110 |
| B8 | 0101010011 |
| B9 | 0111110011 |
| BA | 1010010011 |
| BB | 1101110011 |
| BC | 0101010110 |
| BD | 0111110110 |
| BE | 1010010110 |
| BF | 1101110110 |
| C0 | 0101001101 |
| C1 | 1011010011 |
| C2 | 1011010110 |
| C3 | 0101011001 |
| C4 | 0110010101 |
| C5 | 1010011001 |
| C6 | 0110011010 |
| C7 | 0110011111 |
| C8 | 0110101001 |
| C9 | 0110110010 |
| CA | 0110110111 |
| CB | 0110111101 |
| CC | 0111100111 |
| CD | 0111101101 |
| CE | 0111111001 |
| CF | 0101111111 |
| D0 | 1100101001 |
| D1 | 1100110010 |
| D2 | 1100110111 |
| D3 | 1100111101 |
| D4 | 1101100111 |
| D5 | 1101101101 |
| D6 | 1101111001 |
| D7 | 1101111111 |
| D8 | 1111001101 |
| D9 | 1110010011 |
| DA | 1110010110 |
| DB | 1111011001 |
| DC | 0101011111 |
| DD | 0111011111 |
| DE | 1010111111 |
| DF | 1101011111 |
| E0 | 0111101010 |
| E1 | 0111101111 |
| E2 | 0111111011 |
| E3 | 0111111110 |
| E4 | 1101101010 |
| E5 | 1101101111 |
| E6 | 1101111011 |
| E7 | 1101111110 |
| E8 | 1111001111 |
| E9 | 1111011011 |
| EA | 1111011110 |
| EB | 1100111111 |
| EC | 0110101110 |
| ED | 1111110011 |
| EE | 1111110110 |
| EF | 0110111111 |
| F0 | 1010101101 |
| F1 | 0110101110 |
| F2 | 0101011110 |
| F3 | 1001111111 |

TABLE I-continued

Data Translations
(Even Number of Bits, Polarity is +;
Odd Number of Bits, Polarity is −)

| 8 (Hex.) | 10 |
|---|---|
| F4 | 1011010101 |
| F5 | 1011110111 |
| F6 | 1011111101 |
| F7 | 1011011111 |
| F8 | 1100100110 |
| F9 | 1110110111 |
| FA | 1110111101 |
| FB | 1110011111 |
| FC | 1111100111 |
| FD | 1111101101 |
| FE | 1111111001 |
| FF | 1111011111 |

TABLE II

ISN Translations
(Even Number of Bits, Polarity is +;
Odd Number of Bits, Polarity is −)

| | 6 (Hex.) | 10 |
|---|---|---|
| 0 | 00 | 1111111011 |
| 1 | 01 | 1111111101 |
| 2 | 02 | 1111110111 |
| 3 | 03 | 1111110101 |
| 4 | 04 | 1110111011 |
| 5 | 05 | 1110111101 |
| 6 | 06 | 1110110111 |
| 7 | 07 | 1110110101 |
| 8 | 08 | 1101011011 |
| 9 | 09 | 1101011101 |
| 10 | 0A | 1101010111 |
| 11 | 0B | 1101010101 |
| 12 | 0C | 1011111011 |
| 13 | 0D | 1011111101 |
| 14 | 0E | 1011110111 |
| 15 | 0F | 1011110101 |
| 16 | 10 | 1010111011 |
| 17 | 11 | 1010111101 |
| 18 | 12 | 1010110111 |
| 19 | 13 | 1010110101 |
| 20 | 14 | 1111011111 |
| 21 | 15 | 1111011101 |
| 22 | 16 | 1111010111 |
| 23 | 17 | 1111010101 |
| 24 | 18 | 1101111111 |
| 25 | 19 | 1101111101 |
| 26 | 1A | 1101110111 |
| 27 | 1B | 1101110101 |
| 28 | 1C | 1011011111 |
| 29 | 1D | 1011011101 |
| 30 | 1E | 1011010111 |
| 31 | 1F | 1011010101 |
| 32 | 20 | 1110111111 |
| 33 | 21 | 1111101111 |
| 34 | 22 | 1111101101 |
| 35 | 23 | 1111101011 |
| 36 | 24 | 1101011111 |
| 37 | 25 | 1110101111 |
| 38 | 26 | 1110101101 |
| 39 | 27 | 1110101011 |
| 40 | 28 | 1010111111 |
| 41 | 29 | 1011101111 |
| 42 | 2A | 1011101101 |
| 43 | 2B | 1011101011 |
| 44 | 2C | 1011111111 |
| 45 | 2D | 1010101111 |
| 46 | 2E | 1010101011 |
| 47 | 2F | 1101101011 |

What is claimed is:

1. An apparatus for digital recording by discrete stripes on magnetic tape, said apparatus comprising:

input means adapted to receive data to be recorded and providing a first output in digital form indicative thereof;

reference generating means for providing a second output in digital form for referencing purposes, said reference generating means including a plurality of reference signal generators including a clock reference region generator, a bit synchronization field generator, and an information segment number generator;

formatting means for receiving said first and second outputs and providing a combined digital output that includes both said first and second outputs, said formatting means including logic means for receiving the outputs from said plurality of reference signal generators, said logic means including a plurality of gates for separately receiving the outputs from each of said plurality of reference signal generators;

recording means for recording said combined serial digital output from said formatting means, said combined digital output from said formatting means being recorded on each said stripe of said magnetic tape in at least first and second sections with said first section including a first portion of said second output for referencing purposes and said second section including said first output indicative of data to be recorded and a second portion of said second output for referencing purposes; and, sequencing means connected with said gates for controlling sequencing therethrough.

2. The apparatus of claim 1 wherein said first and second sections are preamble and physical data block sections, respectively, and wherein said preamble section precedes said physical data block section.

3. The apparatus of claim 2 wherein said physical data block section includes a plurality of physical data blocks each of which is divided into a plurality of sub-blocks, each of which sub-blocks receives a portion of said first and second outputs so that each of said sub-blocks receives data to be recorded and referencing information.

4. The apparatus of claim 1 wherein said second output includes identifying information in digital form, and wherein said identifying information in digital form is recorded at said second section.

5. The apparatus of claim 1 wherein said formatting means includes a third section, and wherein a part of said second output is recorded at said third section.

6. The apparatus of claim 1 wherein said reference generating means separately generates location and frequency/phase referencing signals.

7. The apparatus of claim 6 wherein said formatting means provides said digital output signals in predetermined first, second and third sections, with said first section being a preamble having said location and frequency/phase reference digital signals separately included therein, with said second section including a plurality of physical data blocks having at least said data to be recorded included therein, and with said third section being a postamble to insure compatibility of physical alignment between said recording means and said magnetic tape.

8. The apparatus of claim 1 wherein said apparatus includes playback means for reading information recorded on said tape, and deformatting means connected with said playback means for recovering said data read from said tape.

9. The apparatus of claim 8 wherein said deformatting means separates said recorded data from said referencing information recorded on said tape.

10. The apparatus of claim 1 wherein said apparatus includes a rotatable drum having said recording means mounted thereon, and wherein said tape is caused to move at a relatively slow rate relative to the speed of rotation of said drum whereby said information is densely recorded on said magnetic tape with low error rates.

11. The apparatus of claim 10 wherein said density of recorded information is about 36 million bits per square inch.

12. Apparatus for recording digital data on a storage medium in the form of helical stripes, said apparatus comprising:

input means for receiving data to be recorded including error correction information;

means for generating a unique sequence of digital signals to serve as a bit synchronization field;

means for generating a plurality of information segment numbers, each information segment number being a sequence of digital signals;

sequencing control means connected to said input means and both of said generating means for formatting a predetermined plurality of blocks of data for writting in a helical stripe on said storage medium, each block comprising a predetermined plurality of sub-blocks, each of said sub-blocks including said bit synchronization field, an information segment number, and an information segment field comprising a portion of data received from said input means including error correction information, and wherein each sub-block in each block has a unique information segment number; and, means responsive to said sequencing control means for recording said predetermined plurality of blocks in a stripe on said storage medium.

13. The apparatus of claim 12, wherein said storage medium is 8 millimeter magnetic tape.

14. The apparatus of claim 13, wherein said predetermined plurality of blocks written in a stripe on said medium is eight (8).

15. The apparatus of claim 13, wherein said predetermined plurality of sub-blocks included in a block is forty-eight (48).

16. The apparatus of claim 12, wherein said bit synchronization field is identifiable when included in a 8/10 RLL bit steam.

17. The apparatus of claim 16, wherein said bit synchronization field is the following twenty (20) bit digital sequence: 01111111111111111110.

18. The apparatus of claim 12, wherein each information segment number is a ten (10)-bit RLL sequence that provides a unique segment identifier.

19. The apparatus of claim 18, wherein values corresponding to information segment numbers are selected from 10-bit values which begin and end with digital ONE and which do not have two consecutive digital ZEROs.

20. The apparatus of claim 12, wherein each information segment field consists of 30 units of information, each unit being a ten (10)-bit RLL sequence.

21. The apparatus of claim 12, wherein said sequencing control means has output terminals corresponding to said input means and both of said generation means, each of said output terminals being connected to signal gating means which is also connected to an output terminal of a corresponding one of said input means and said generation means whereby for each helical stripe on said storage medium said sequencing control means causes signals to be gated from said input means and both of said generation means and transmitted to said recording means.

22. The apparatus of claim 12, further comprising:
means for generating a set of digital signals which serves as clock reference information for providing frequency and phase reference information;
means for generating a sequence of digital bits which serves as a postamble; and,
wherein said sequencing control means formats each stripe whereby each stripe has a preamble before said predetermined plurality of blocks and a postamble after said predetermined plurality of blocks, said preamble comprising said set of digital signals which serve as said clock reference information.

23. The apparatus of claim 22, wherein in said preamble each of four (4) sets of signals serving as a clock reference signals is followed by a unique physical reference signal.

24. The apparatus of claim 22, wherein each set of digital signals serving as a clock reference signal consists of 654 binary ONEs.

25. The apparatus of claim 22, wherein said postamble consists of a 3304-bit serial sequence of all binary ONEs.

26. The apparatus of claim 12, further comprising means for translating the data received by said input means from an 8 to 10-bit representation for use as said digital signals related to data received by said input means, said means for translating said received data being configured to express said digital signals as 10-bit digital values in accordance with the following:
selecting values which do not begin or end with two zeros and which do not have three consecutive zeros;
excluding the values 0111111111, 1111111111, 1111111110 to avoid confusion with the bit synchronization field;
preferring values having low digital sum variations (DSV) over those which have high digital sum variations;
preferring values having odd parity over values having even parity; and,
excluding values corresponding to information segment numbers.

27. The apparatus of claim 26, wherein values corresponding to information segment numbers are selected from 10-bit values which begin and end with digital ONE and which do not have two consecutive digital ZEROs.

28. A method for recording digital data on a storage medium in the form of helical stripes, said method comprising:
receiving data to be recorded including error correction information;
generating a unique sequence of digital signals to serve as a bit synchronization field;
generating a plurality of information segment numbers, each information segment number being a sequence of digital signals;
formatting a predetermined plurality of blocks of data for writting in a helical stripe on said storage medium, each block comprising a predetermined plurality of sub-blocks, each of said sub-blocks including said bit synchronization field, an information segment number, and an information segment field comprising a portion of data received from said input means including error correction information, and wherein each sub-block in each block has a unique information segment number; and,
recording said predetermined plurality of blocks in a stripe on said storage medium.

29. The method of claim 28, wherein said storage medium is 8 millimeter magnetic tape.

30. The method of claim 29, wherein said predetermined plurality of blocks written in a stripe on said medium is eight (8).

31. The method of claim 29, wherein said predetermined plurality of sub-blocks included in a block is forty-eight (48).

32. The method of claim 28, wherein said bit synchronization field is identifiable when included in a 8/10 RLL bit steam.

33. The method of claim 32, wherein said bit synchronization field is the following twenty (20) bit digital sequence: 01111111111111111110.

34. The method of claim 28, wherein each information segment number is a ten (10)-bit RLL sequence that provides a unique segment identifier.

35. The method of claim 34, wherein values corresponding to information segment numbers are selected from 10-bit values which begin and end with digital ONE and which do not have two consecutive digital ZEROs.

36. The method of claim 28, wherein each information segment field consists of 30 units of information, each unit being a ten (10)-bit RLL sequence.

37. The method of claim 28, further comprising:
generating a set of digital signals which serves as clock reference information for providing frequency and phase reference information;
generating a sequence of digital bits which serves as a postamble; and,
wherein each of said stripes is formatted to include a preamble before said preamble plurality of blocks and a postamble after said predetermined plurality of blocks, said preamble comprising said set of digital signals which serve as said clock reference information.

38. The method of claim 37, wherein in said preamble each of four (4) sets of signals serving as a clock reference signals is followed by a unique physical reference signal.

39. The method of claim 37, wherein each set of digital signals serving as a clock reference signal consists of 654 binary ONEs.

40. The method of claim 37, wherein said postamble consists of a 3304-bit serial sequence of all binary ONEs.

41. The method of claim 28, further comprising translating said received data from an 8 to 10-bit representation for use as said digital signals related to said received data, said translation being conducted to express said digital signals as 10-bit digital values in accordance withthe following steps:
selecting values which do not begin or end with two zeros and which do not have three consecutive zeros;
excluding the values 0111111111, 1111111111, 1111111110 to avoid confusion with the bit synchronization field;
preferring values having low digital sum variations (DSV) over those which have high digital sum variations;

preferring values having odd parity over values having even parity; and, excluding values corresponding to information segment numbers.

42. The method of claim 41, wherein values corresponding to information segment numbers are selected from 10-bit values which begin and end with digital ONE and which do not have two consecutive digital ZEROs.

43. Apparatus for recording digital data on a storage medium in the form of helical stripes, said apparatus comprising input means for receiving data to be recorded; means for generating a unique sequence of digital signals to serve as a bit synchronization field; means for controlling the formatting of digital signals for storage on said storage medium; means responsive to said formatting control means for recording a stripe on said storage medium, characterized by the provision of:

means for generating a plurality of information segment numbers, each information segment number being a sequence of digital signals;

wherein said formatting control means is connected to said input means and both of said generating means for formatting a predetermined plurality of blocks of data for writing in a helical stripe on said storage medium, each block comprising a predetermined plurality of sub-blocks, each of said sub-blocks including said bit synchronization field, an information segment number, and an information segment field comprising a portion of data received from said input means including error correction information, and wherein each sub-block in each block has a unique information segment number.

44. The apparatus of claim 43, wherein said storage medium is 8 millimeter magnetic tape.

45. The apparatus of claim 44, wherein said predetermined plurality of blocks written in a stripe on said medium is eight (8).

46. The apparatus of claim 44, wherein said predetermined plurality of sub-blocks included in a block is forty-eight (48).

47. The apparatus of claim 43, wherein said bit synchronization field is identifiable when included in a 8/10 RLL bit steam.

48. The apparatus of claim 47, wherein said bit synchronization field is the following twenty (20) bit digital sequence: 01111111111111111110.

49. The apparatus of claim 43, wherein each information segment number is a ten (10)-bit RLL sequence that provides a unique segment identifier.

50. The apparatus of claim 49, wherein values corresponding to information segment numbers are selected from 10-bit values which begin and end with digital ONE and which do not have two consecutive digital ZEROs.

51. The apparatus of claim 43, wherein each information segment field consists of 30 units of information, each unit being a ten (10)-bit RLL sequence.

52. The apparatus of claim 43, further comprising means for translating the data received by said input means from an 8 to 10-bit representation for use as said digital signals related to data received by said input means, said means for translating said received data being configured to express said digital signals at 10-bit digital values in accordance with the following:

selecting values which do not begin or end with two zeros and which do not have three consecutive zeros;

excluding the values 0111111111, 1111111111, 1111111110 to avoid confusion with the bit synchronization field;

preferring values having low digital sum variations (DSV) over those which have high digital sum variations;

preferring values having odd parity over values having even parity; and, excluding values corresponding to information segment numbers.

53. The apparatus of claim 52, wherein values corresponding to information segment numbers are selected from 10-bit values which begin and end with digital ONE and which do not have two consecutive digital ZEROs.

54. A method for recording digital data on a storage medium in the form of helical stripes, said method comprising receiving data to be recorded; generating a unique sequence of digital signals to serve as a bit synchronization field; controlling the formatting of digital signals for storage on said storage medium; and, recording a stripe on said storage medium, characterized by:

generating a plurality of information segment numbers, each information segment number being a sequence of digital signals;

formatting a predetermined plurality of blocks of data for writing in a helical stripe on said storage medium, each block comprising a predetermined plurality of sub-blocks, each of said sub-blocks including said bit synchronization field, an information segment number, and an information segment field comprising a portion of data received from said input means including error correction information, and wherein each sub-block in each block has a unique information segment number.

55. The method of claim 54, wherein said storage medium is 8 millimeter magnetic tape.

56. The method of claim 55, wherein said predetermined plurality of blocks written in a stripe on said medium is eight (8).

57. The method of claim 55, wherein said predetermined plurality of sub-blocks included in a block is forty-eight (48).

58. The method of claim 54, wherein said bit synchronization field is identifiable when included in a 8/10 RLL bit steam.

59. The method of claim 58, wherein said bit synchronization field is the following twenty (20) bit digital sequence: 01111111111111111110.

60. The method of claim 54, wherein each information segment number is a ten (10)-bit RLL sequence that provides a unique segment identifier.

61. The method of claim 60, wherein values corresponding to information segment numbers are selected from 10-bit values which begin and end with digital ONE and which do not have two consecutive digital ZEROs.

62. The method of claim 54, wherein each information segment field consists of 30 units of information, each unit being a ten (10)-bit RLL sequence.

63. The method of claim 54, further comprising translating said received data from an 8 to 10-bit representation for use as said digital signals related to said received data, said translation being conducted to express said digital signals as 10-bit digital values in accordance with the following steps:

selecting values which do not begin or end with two zeros and which do not have three consecutive zeros;

excluding the values 0111111111, 1111111111, 1111111110 to avoid confusion with the bit synchronization field;

preferring values having low digital sum variations (DSV) over those which have high digital sum variations;

preferring values having odd parity over values having even parity; and, excluding values corresponding to information segment numbers.

64. The method of claim 63, wherein values corresponding to information segment numbers are selected from 10-bit values which begin and end with digital ONE and which do not have two consecutive digital ZEROs.

* * * * *